US012476400B2

(12) United States Patent
Xu et al.

(10) Patent No.: US 12,476,400 B2
(45) Date of Patent: Nov. 18, 2025

(54) POWER CARD EDGE CONNECTOR WITH IMPROVED POWER TERMINALS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Ming-Liu Xu, Kunshan (CN); Teng Qin, Kunshan (CN); Wen-Jun Tang, Kunshan (CN); Xue-Wu Bu, Kunshan (CN); Hung-Chi Yu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 392 days.

(21) Appl. No.: 18/139,537

(22) Filed: Apr. 26, 2023

(65) Prior Publication Data

US 2023/0369793 A1 Nov. 16, 2023

(30) Foreign Application Priority Data

May 13, 2022 (CN) ......................... 202221152176.5

(51) Int. Cl.
*H01R 12/73* (2011.01)
*H01R 13/115* (2006.01)

(52) U.S. Cl.
CPC ......... *H01R 12/737* (2013.01); *H01R 13/115* (2013.01)

(58) Field of Classification Search
CPC ...... H01R 12/737; H01R 12/73; H01R 12/72; H01R 12/79; H01R 12/82; H01R 13/193; H01R 13/10; H01R 13/11; H01R 13/114; H01R 13/04; H01R 13/02
USPC ........................................................... 439/59
See application file for complete search history.

(56) References Cited

U.S. PATENT DOCUMENTS 8,323,049 B2 * 12/2012 Ngo ..................... H01R 13/514 439/552
8,602,796 B2 * 12/2013 Chin .................... H01R 13/113 439/825
8,662,923 B2 * 3/2014 Wu ........................ H01R 12/58 439/947

(Continued)

FOREIGN PATENT DOCUMENTS

CN 207183596 U 4/2018
CN 109119780 A 1/2019

*Primary Examiner* — Harshad C Patel
(74) *Attorney, Agent, or Firm* — Ming Chieh Chang

(57) ABSTRACT

A power card edge connector includes: a housing defining a card slot; and a power terminal comprising an inner piece and an outer piece stacked together, the inner piece comprising a first retaining portion and a first elastic portion, the outer piece comprising a second retaining portion and a second elastic portion, the first and second retaining portions attached together, wherein the first elastic portion defines a first contacting portion, the second elastic portion is split into a second contacting portion and an abutting portion separated from each other, the first and second the contacting portions are arranged side by side and protrude into the card slot, and the first contacting portion is pushable outward to abut against the abutting portion.

16 Claims, 9 Drawing Sheets

(56) References Cited

U.S. PATENT DOCUMENTS

| | | | | |
|---|---|---|---|---|
| 10,128,589 | B2 * | 11/2018 | Yamaguchi | H01R 12/721 |
| 10,411,382 | B2 * | 9/2019 | Sichmann | H01R 13/113 |
| 10,637,175 | B1 * | 4/2020 | Zou | H05K 1/117 |
| 11,817,646 | B2 * | 11/2023 | Chen | H01R 13/2457 |
| 2007/0293084 | A1 * | 12/2007 | Ngo | H01R 12/737 439/552 |
| 2009/0298305 | A1 * | 12/2009 | Wu | H01R 13/506 439/62 |
| 2019/0089081 | A1 | 3/2019 | Zhang | |
| 2020/0153141 | A1 * | 5/2020 | Zhang | H01R 13/11 |
| 2020/0343661 | A1 * | 10/2020 | Wu | H01R 12/727 |
| 2021/0143570 | A1 * | 5/2021 | Xu | H01R 13/405 |
| 2022/0013942 | A1 | 1/2022 | Guo et al. | |
| 2022/0029333 | A1 * | 1/2022 | Horning | H01R 12/7088 |

* cited by examiner

POWER CARD EDGE CONNECTOR WITH IMPROVED POWER TERMINALS

BACKGROUND OF THE INVENTION

Field of the Invention

The present invention relates generally to a power card edge connector.

Description of Related Arts

In hybrid power card edge connector, two-piece power terminals are widely used to enlarge power current and mechanical strength. Considering material and mass-product cost, some aspects of those connectors are still needed to improve.

SUMMARY OF THE INVENTION

The objective of the present invention is to provide a power card edge connector.

To achieve the above object, a power card edge connector comprises: an insulating housing defining a mating face and a card slot opening through the mating face, the card slot defining a mating direction and an extending direction perpendicular to the mating direction; and a power terminal comprising an inner piece and an outer piece stacked together, the inner piece comprising a first retaining portion and a first elastic portion slantwise extending from the first retaining portion, the outer piece comprising a second retaining portion and a second elastic portion slantwise extending from the second retaining portion, the first and second retaining portions attached together and retained in the insulating housing, wherein the first elastic portion defines a first contacting portion, the second elastic portion is split into a second contacting portion and an abutting portion separated from each other, the first contacting portion and the second contacting portion are arranged side by side in the extending direction and protrude into the card slot, and the first contacting portion is pushable outward to abut against the abutting portion.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
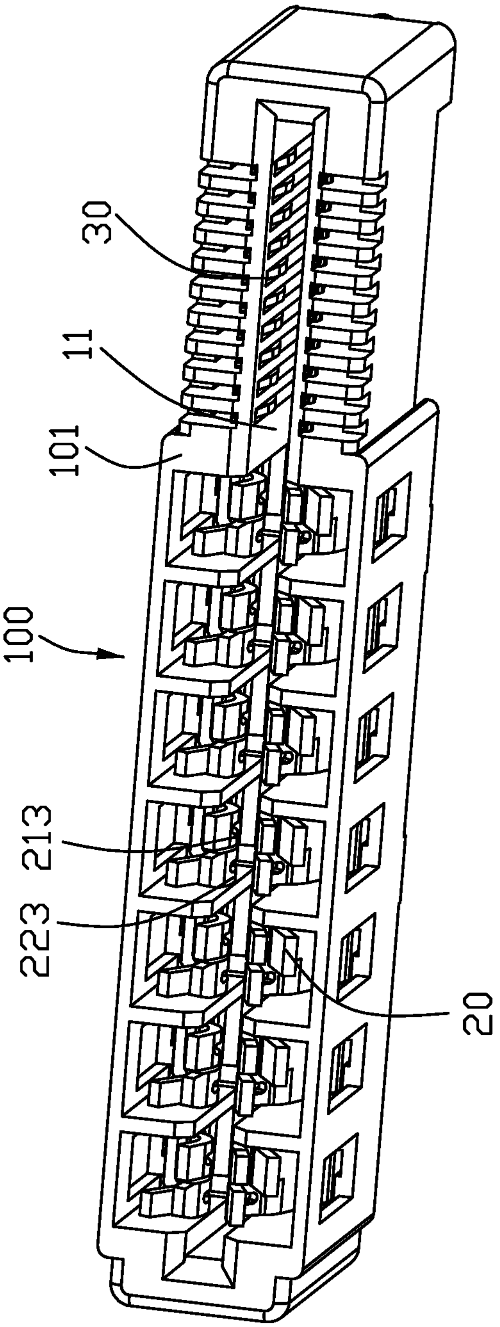
FIG. 1 is a front perspective view of a power card edge connector of this present invention.
Figure 2:
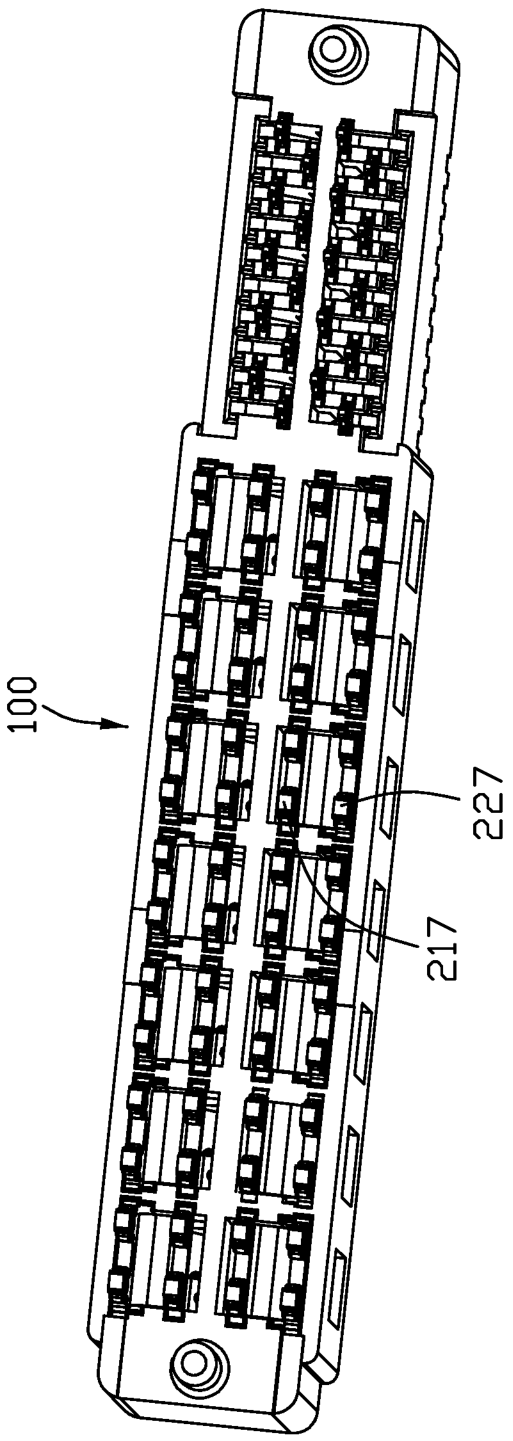
FIG. 2 is a rear perspective view of the power card edge connector in FIG. 1.
Figure 3:
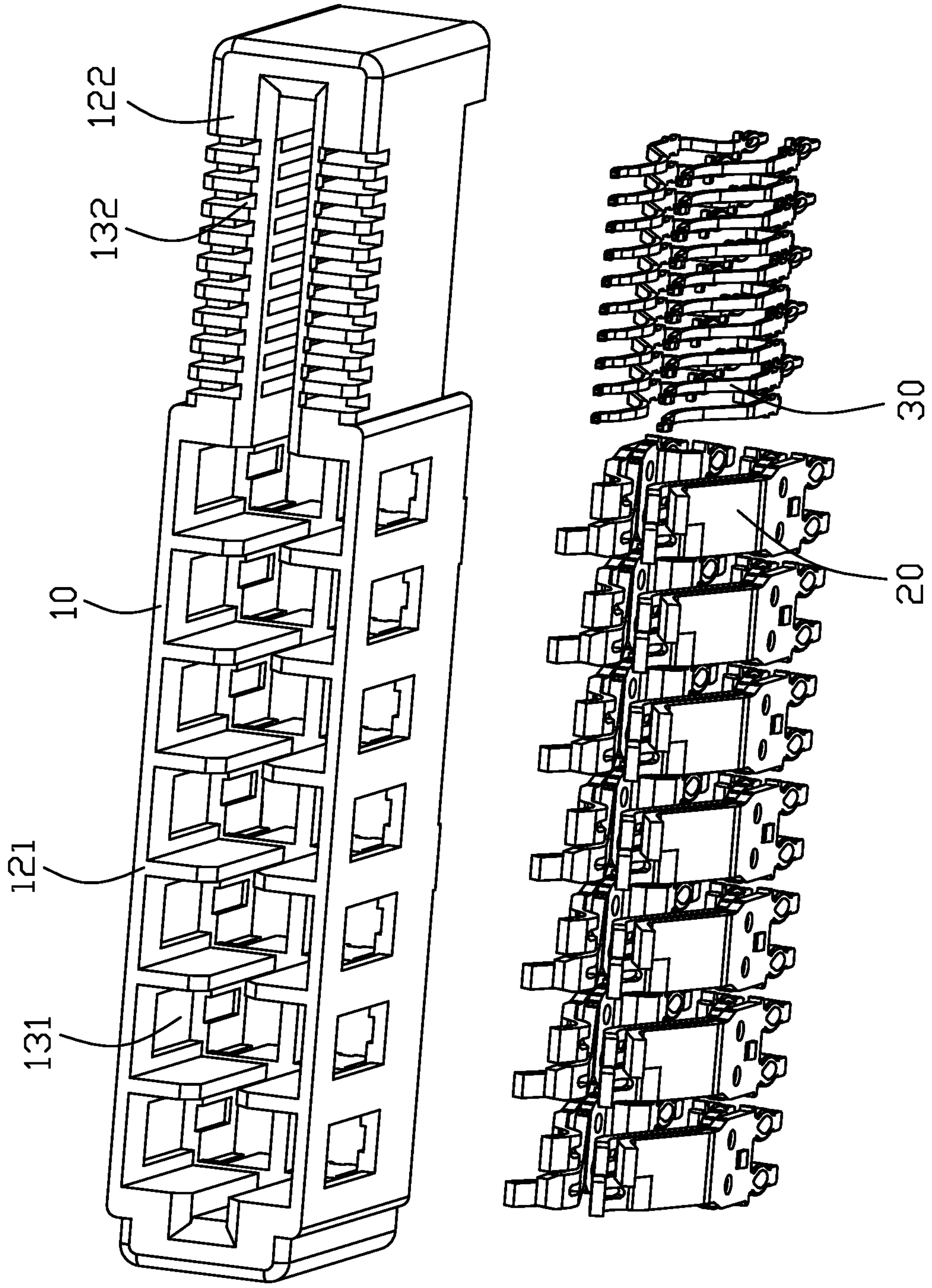
FIG. 3 is an exploded perspective view of the power card edge connector of FIG. 1.
Figure 4:
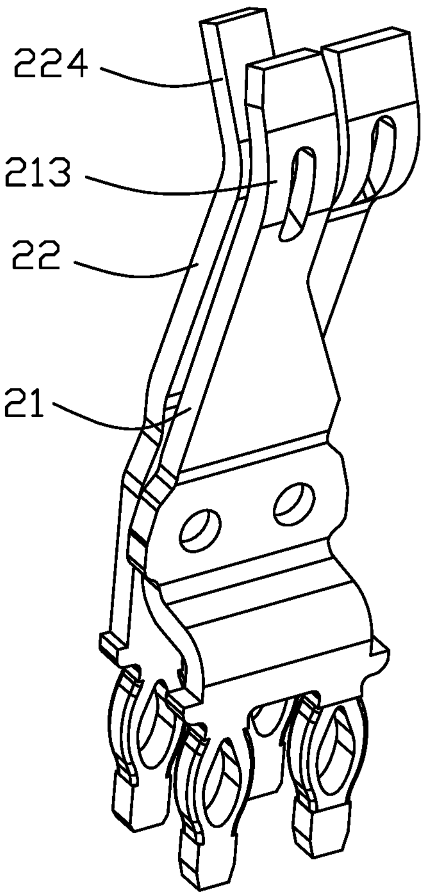
FIG. 4 is a perspective view of a power terminal in FIG. 3.
Figure 5:
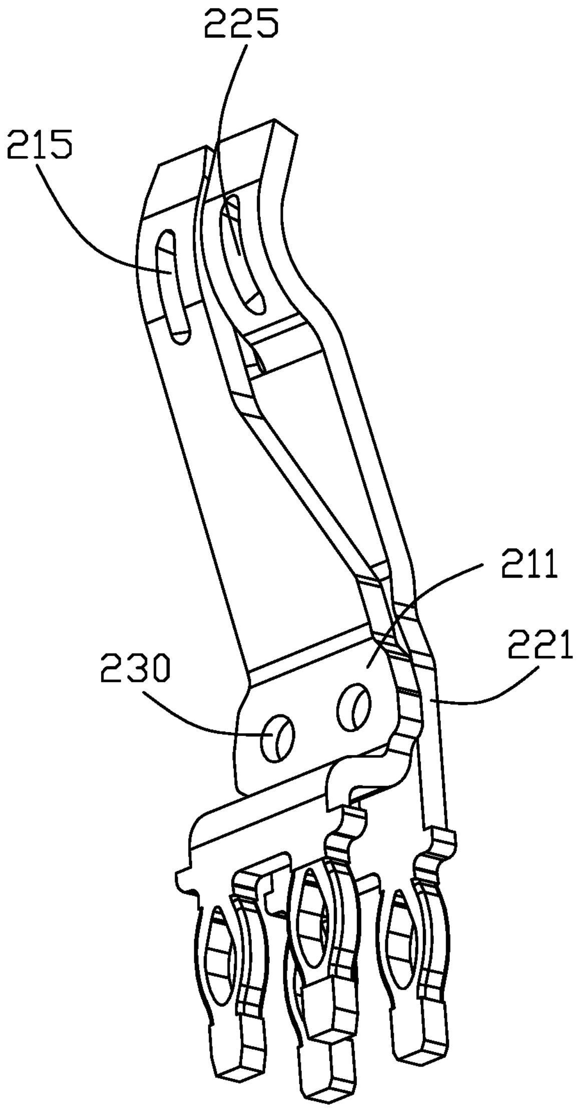
FIG. 5 is another perspective view of the power terminal in FIG. 4.
Figure 6:
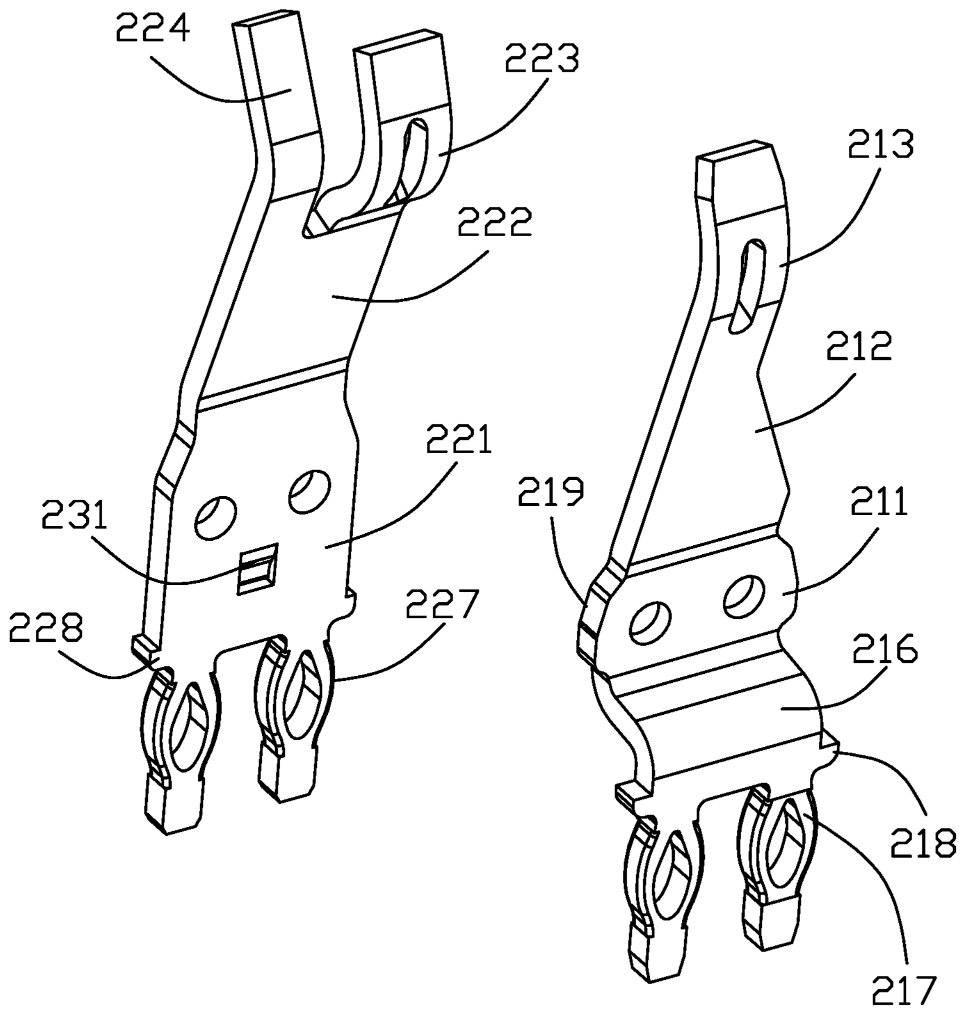
FIG. 6 is an exploded perspective view of the power terminal in FIG. 4.

Referring to FIGS. 1-9, a hybrid card edge connector 100 is illustrated, which is loaded with power terminals and signal terminals, each power terminal is consist of two terminal pieces to enlarge a power current, the signal terminals have a compared smaller size. As shown in FIGS. 1-3, the hybrid card edge connector 100 includes an insulating housing 10, power terminals 20 and signal terminals 30, the insulating housing defines a mating face 101 and a card slot 11 opening through the mating face 101, the card slot defines a mating direction. The power and signal terminals are arranged in an extending direction perpendicular to the mating direction. The left portion/power area 121 of the housing 11 is arranged with the power terminals 20, and the right portion/signal area 122 of the housing is arranged with the signal terminals 30. The power area 121 defines two rows of power terminal passageways 131 at opposite sides of the card slot 11, the signal area 122 defines two rows of signal terminal passageways 132 at opposite sides of the card slot 11. The power terminal passageways 131 have a large size and run through an outer face thereof to air flowing channel.

Figure 7:
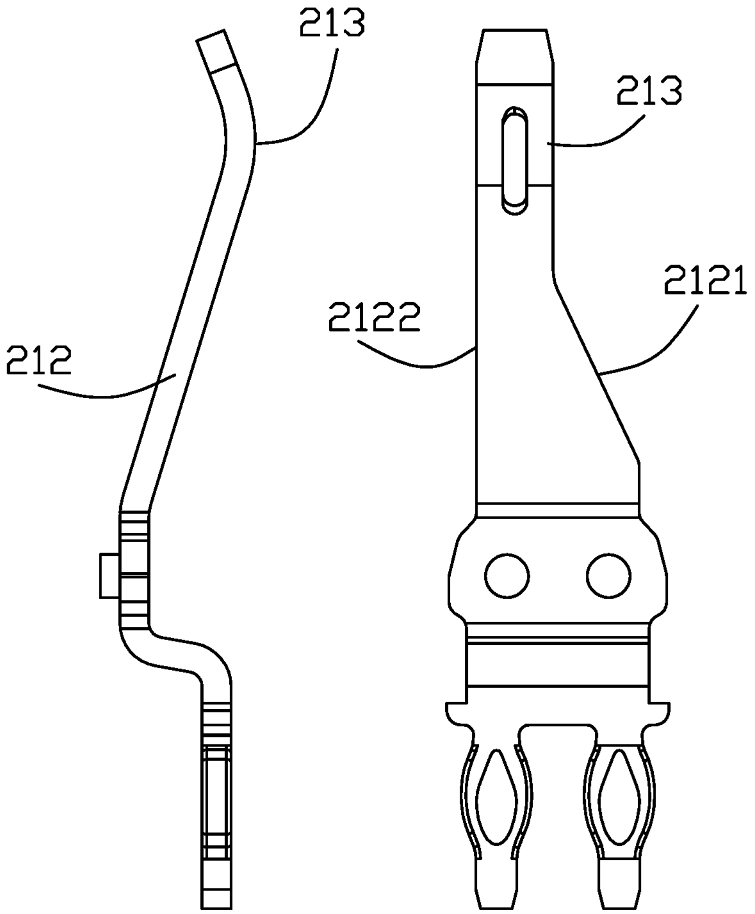
FIG. 7 is a left side elevational view and a front elevational view of an inner piece of the power terminal of in FIG. 6.
Figure 8:
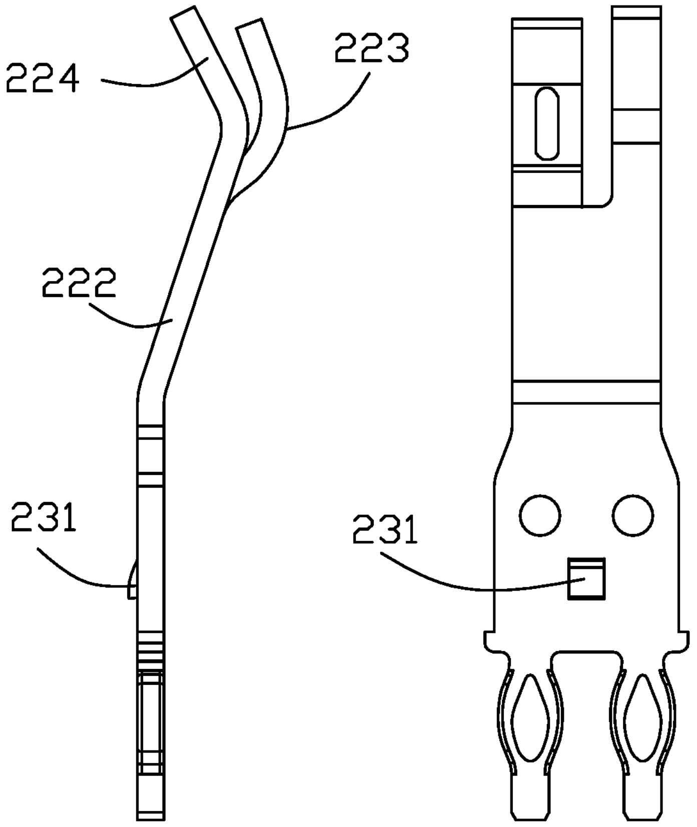
FIG. 8 is a left side elevational view and a front elevational view of an outer piece of the power terminal of in FIG. 6.

Referring to FIGS. 5-9, each of the power terminals 20 includes an inner piece 21 and outer piece 22 staged with each other. The inner piece is located proximate to the card slot while the outer face is at an outer side of the inner piece. The inner piece 21 includes a first retaining portion 211 and a first elastic portion 212 slantwise extending from the first retaining portion 211, the outer piece 22 includes a second retaining portion 221 and a second elastic portion 222 extending from the second retaining portion 221. The second retaining portion is attached an outer side of the first retaining portion as shown in FIG. 8, and the attached first and second retaining portions are retained in the housing 10. As shown, the first and the second elastic portion are in a form of a slant arm. In this embodiment, the two rows of power terminals are provided. The first elastic portion defines a first contacting portion 213 near to a distal free end thereof, the first contacting portions 213 extend into the car slot 11, the second elastic portions 222 defines a second contacting portion 223 and an abutting portion 224, which two are split from the distal end of the second elastic portion 222 and arranged side by side in the extending portion. The first and the second elastic portions are arranged side by side and aligned with each other in the extending direction, and the first contacting portion 213 moves outward and abuts against the abutting portion 224, thereby, two contacting portions being provide to enlarge the capability of power current. The abutting portion 224 is disposed behind the first contacting portion 213 and supports the first contacting portion 213 for avoiding over movement backwards.

In this embodiment, the first elastic portion 212 of the inner piece 20 arm is convergent and shifts to the second side of the inner piece 20 in an asymmetrical form, so that the first and the second contacting portions 213, 223 are disposed side by side in the extending direction, resulting in two contacting points with an inserting power card. Referring to FIG. 7, the first elastic portion 212 defines two opposite sides, a first side 2121 and a second side 2122. The first side 2121 has a larger angle than the second side 2122. The second side edge 2122 is co-plane with corresponding side of the first contacting portions 213. In a transverse direction perpendicular to the mating direction and the extending direction, the second side 2122 of the first elastic portion 212 is an upright line while the first side 2121 of the first elastic portion 212 is a slant line as shown in FIG. 7. In other words, the first elastic portion 212 is in a slant arm extending from the first retaining portion, and a distal free end of the slant arm bends outwards to form the first contacting portion, the second elastic portion 222 is in a slant arm extending from the second retaining portion and a distal free end of the slant arm bends outward to form the abutting portion, a portion of the abutting portion is split and then slant inwards and aligned with the first contacting portion in the extending direction to form the second contacting portion 223.

The first contacting portion 213 defines a long slot 215 opening through an inner and outer faces thereof, the long slot 215 extends in the mating direction, but do not run through the distal free end of the contacting portions. A shift portion 216 bends inward from the first retaining portion 211 and a first soldering portion 217 bends downwards from the shift portion 216. The first soldering portion defines two eye-of-needle legs to be inserted into a printed circuit board. The shift portion 216 defines two ribs 218 protruding outwards at opposite side edges thereof in the extending direction proximate to the soldering portion 217. The second contacting portion 223 defines a long slot 225 opening through an inner and outer faces thereof, the long slot 225 extends in the mating direction, but do not run through the distal end of the contacting portions.

A second soldering portion 227 extends from the second retaining portion 221 and defines two eye-of-needle legs to be inserted into the printed circuit board. The second retaining portion 227 defined two ribs 228 protruding outwards from two opposite side edges thereof in the extending direction. The first and the second retaining portions defined holes 230 for flowing of soldering material and retaining the two retaining portions together. The first retaining portion defines inferring portions 219 at opposite side edges. The second portion 221 without any inferring portions, extend downward than the first retaining portion. The second retaining portion defines a punching tab 23, the punching tab 23 is retained in the housing, the inferring portions 219 of the first retaining portion 211 are retained in the housing.

Figure 9:
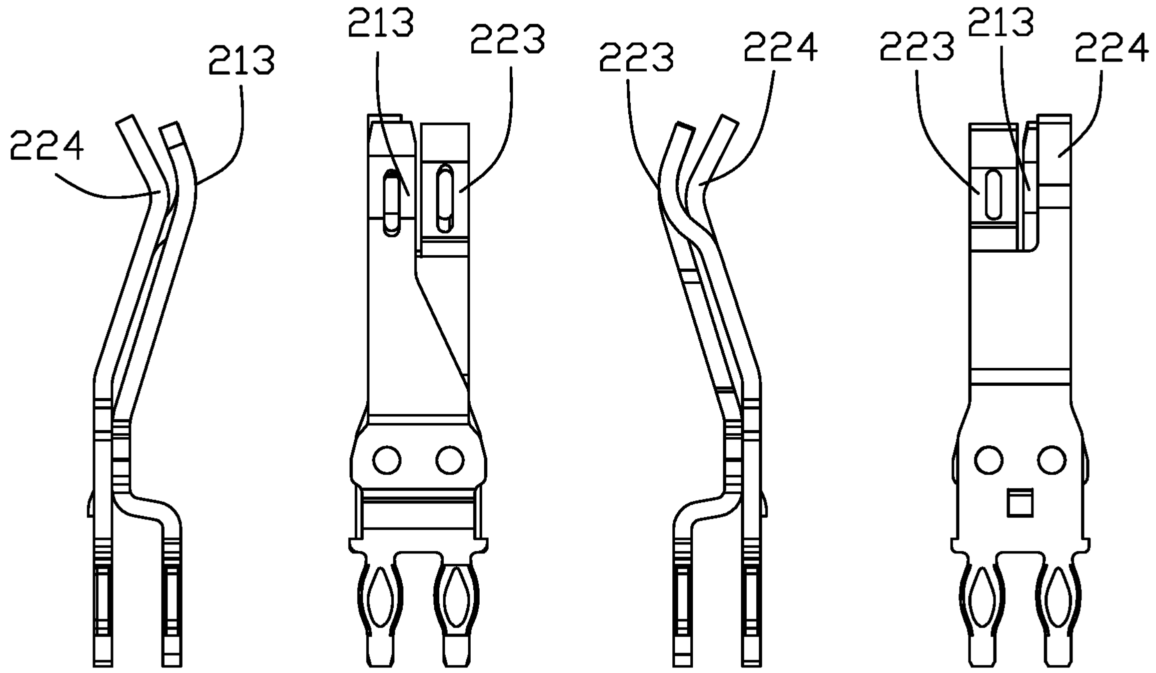
FIG. 9 is a left side elevational view, a front elevational view, a right elevational view, and a rear elevational view of the power terminal in FIG. 4

Referring to FIG. 9, the width of the second contacting portion is larger than the width of the abutting portion 224 in the extending direction, the width of the first contacting portion is larger than the width of the abutting portion 224 in the extending direction. Referring to FIG. 2, the soldering portions of the power terminals are arranged in four rows, the soldering portions of the signal terminals are in two rows.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. A power card edge connector comprising:

an insulating housing defining a mating face and a card slot opening through the mating face, the card slot defining a mating direction and an extending direction perpendicular to the mating direction; and a power terminal comprising an inner piece and an outer piece stacked together, the inner piece comprising a first retaining portion and a first elastic portion slantwise extending from the first retaining portion, the outer piece comprising a second retaining portion and a second elastic portion slantwise extending from the second retaining portion, the first and second retaining portions attached together and retained in the insulating housing;

wherein the first elastic portion defines a first contacting portion, the second elastic portion is split into a second contacting portion and an abutting portion separated from each other, the first contacting portion and the second contacting portion are arranged side by side in the extending direction and protrude into the card slot, and the first contacting portion is pushable outward to abut against the abutting portion.

2. The power card edge connector as claimed in claim 1, wherein the first elastic portion is convergent and shift away from the second contacting portion.

3. The power card edge connector as claimed in claim 2, wherein the first elastic portion defines a first edge and a second edge opposite to the first edge in the extending direction; viewed in a transverse direction perpendicular to the mating direction and the extending direction, the first edge is an upright line and the second edge is a slant line.

4. The power card edge connector as claimed in claim 3, wherein the first contacting portion defines a long slot opening through an inner face and an outer face thereof, the long slot extends in the mating direction but not run through the first contacting direction.

5. The power card edge connector as claimed in claim 4, wherein the second contacting portion defines a long slot opening through an inner face and an outer face thereof, the long slot extends in the mating direction but not run through the first contacting direction.

6. The power card edge connector as claimed in claim 1, wherein the second contacting portion is wider than the abutting portion in the extending direction.

7. The power card edge connector as claimed in claim 1, wherein the first contacting portion is wider than the abutting portion in the extending direction.

8. The power card edge connector as claimed in claim 1, wherein the first retaining portion and the second retaining portion are fitly stacked and soldered together by holes defined thereon.

9. The power card edge connector as claimed in claim 1, wherein the inner piece comprises a shifting portion bending inward from the first retaining portion and a first soldering portion extending from the shifting portion, the first soldering portion comprises two eye-of-needle legs.

10. The power card edge connector as claimed in claim 9, wherein the outer piece comprises a second soldering portion extending from the second retaining portion, the second soldering portion comprises two eye-of-needle legs.

11. The power card edge connector as claimed in claim 10, wherein the first retaining portion defines referring ribs at opposite sides thereof in the extending direction, the second retaining portion defines a punch tab in the transverse direction.

12. A power card edge connector comprising:

an insulating housing defining a mating face and a card slot opening through the mating face, the card slot extending in a mating direction and an extending direction; and a power terminal comprising an inner piece proximate to the card slot and an outer piece stacked at an outer side of the inner piece, the inner piece comprising a first retaining portion and a first elastic portion slantwise extending from the first retaining portion, the outer piece comprising a second retaining portion and a second elastic portion slantwise extending from the second retaining portion, the first and second retaining portion retained in the insulating housing;

wherein the first elastic portion defines a first contacting portion, the second elastic portion defines a second contacting portion, the first retaining portion and the second retaining portion are aligned with each other in a transverse direction perpendicular to the mating direction and the extending direction, the first elastic arm is convergent and shifts away from the second contacting portion, and the first contacting portion and the second contacting portion are arranged side by side in the extending direction and protrude into the card slot.

13. The power card edge connector as claimed in claim 12, wherein viewed in the transverse direction, the first elastic portion defines an upright line and a slant line while the first contacting portion defines two upright lines, and the second elastic portion defines two upright lines.

14. The power card edge connector as claimed in claim 12, wherein each of the first contacting portion and the second contacting portion defines an upright slot opening through an inner face and an outer face thereof.

15. A power card edge connector comprising:

an insulating housing defining a mating face and a card slot opening through the mating face, the card slot extending in a mating direction and an extending direction; and a power terminal comprising an inner piece proximate to the card slot and an outer piece stacked at an outer side of the inner piece, the inner piece comprising a first retaining portion and a first slant arm extending from the first retaining portion, the outer piece comprising a second retaining portion and a second slant arm extending from the second retaining portion, the first and second retaining portions retained in the insulating housing;

wherein the first slant arm defines a first contacting portion, the second slant arm is split from a top end of the second slant arm into a second contacting portion and an abutting portion, the first contacting portion and the second contacting portion are arranged side by side and aligned with each other in the extending direction and protrude into the card slot, and the abutting portion is located at an outer side of the first contacting portion.

16. The power card edge connector as claimed in claim 15, wherein the first elastic arm is convergent and shifts away from the second contacting portion.

* * * * *